US005508998A

United States Patent [19]
Sha et al.

[11] Patent Number: 5,508,998
[45] Date of Patent: Apr. 16, 1996

[54] REMOTE TOKEN RING BEACON STATION DETECTION AND ISOLATION

[75] Inventors: Yufen Sha; Kenrick Kutzler, both of San Jose, Calif.

[73] Assignee: SynOptics Communications, Inc., Santa Clara, Calif.

[21] Appl. No.: 395,846

[22] Filed: Feb. 28, 1995

[51] Int. Cl.$^6$ .............................. H04L 12/26; H04L 12/42
[52] U.S. Cl. ...................... 370/16.1; 370/85.5; 371/20.6
[58] Field of Search ............................... 370/13, 16, 16.1,
370/85.4, 85.5; 340/825.16; 371/11.2, 20.6;
395/183.01

[56] References Cited

U.S. PATENT DOCUMENTS

| | | | |
|---|---|---|---|
| 5,283,783 | 2/1994 | Nguyen et al. | 370/16.1 |
| 5,361,250 | 11/1994 | Nguyen et al. | 370/16.1 |
| 5,363,366 | 11/1994 | Wisdom, Jr. et al. | 370/85.5 X |
| 5,363,493 | 11/1994 | Unverrich | 370/16 X |

*Primary Examiner*—Melvin Marcelo
*Attorney, Agent, or Firm*—Blakely, Sokoloff Taylor & Zafman

[57] ABSTRACT

A network process that automatically identifies and isolates faulty stations or group of stations within a token ring communication network by a process running on an agent that is remote from the beaconing token ring network. Beacon frame counters and good frame counters are maintained by a probe station within the token ring network which provides the counter information to an agent running at a remote location. The remote agent detects a beaconing station in the network by either an incrementing of the beacon frame counter or a failure to increment of the good frame counter within predetermined amounts of time. Once a token ring network segment is determined to be beaconing, an iterative process proceeds through the token ring with commands sent from the remotely operating agent. Stations on the network are iteratively wrapped and unwrapped until the beaconing stations can be determined and isolated from the network.

22 Claims, 11 Drawing Sheets

REMOTE TOKEN RING BEACON STATION DETECTION AND ISOLATION

BACKGROUND OF THE INVENTION

1. Field of the Invention

The present invention relates to communication networks. More particularly, the present invention relates to faulty station identification and isolation in a token ring network.

2. Art Background

Communication networks allow multiple computer systems, peripherals and other information storage, retrieval or processing units (stations) to share data. There are various network topologies that a communication network can adopt which are well-known in the art of communication networks; these topologies include the star topology, tree topology (or generalized bus topology) and token ring topology. In a token ring topology, units or nodes of the communication network are communicatively interconnected in a ring fashion with each node occupying a particular position within the overall ring structure. Several nodes on a particular ring may physically reside on a network concentrator which provides, among other control functions, a coupling platform for the associated nodes (stations). Each network concentrator of a Token Ring network may also contain a network management module which performs several control and timing functions for the nodes of the token ring network.

For one node to communicate with another node in a token ring network it must have priority to a unique token data frame or code which traverses the ring. This token travels around the ring until one node makes a request to communicate. The node wanting to communicate will take the token from the ring and transmit a signal indicating that the token is busy. When the token is busy none of the other nodes may communicate over the ring. The node with the token, the source node, may transmit a message package to another particular node, the destination node. The message package (data frame) will indicate the destination node by a particular label attached to the message. The message is passed along the nodes of the ring structure in a particular direction, node by node, until the destination node receives the message. After the destination node receives the message, it copies the message into an internal buffer and also continues to send the message along the ring until the source node receives the message back. When the source node receives its own message it releases the token back onto the ring and discontinues the message. A network management module (if one is present on the ring) may also remove messages that have traversed the ring more than once, i.e., if the source module faulted after sending the message.

In a token ring structure each node is called a repeater because each node repeats a message through the ring whether or not the message is destined for that node. Therefore, the communications scheme of a ring topology communication network requires that each and every node of the ring be operating properly to repeat messages around the ring. A disastrous effect will occur within a token ring network if one particular node or station malfunctions and will not repeat messages. A faulting station will break the communication line at that point. This occurrence will bring the entire token ring network down since messages will not flow past the malfunctioning node.

There are several potential causes for a node along a token ring to malfunction. First, a node having an incorrect communication frequency may be inserted into the token ring network. The incompatible frequency will lock out the newly added node from the network. Secondly, a cable may break between stations of the ring network thus breaking the ring at one or more places. If adjacent stations become physically isolated the network will fail. A station also may malfunction and not remove itself from the ring causing a break in the communication network. In any of a number of different scenarios, it would be advantageous to be able to detect a malfunctioning node and remove or isolate that node from the remainder of the network to prevent communication failure.

One method of identifying and isolating malfunctioning stations within the token ring system is to unplug cables associated with each station until the malfunctioning station is removed. This solution is not practical in large complicated network systems. Moreover, what is needed is a system that can automatically isolate the problem station without requiring user interaction. IEEE communication standard 802.5 provides a system for beacon removal within a communication network to prevent network shutdown. However, if the malfunctioning or problem station does not conform to the 802.5 standard then the malfunctioning station will not be removed from the ring network. What is needed is a system for identifying and isolating problem stations that do not conform to a particular standardized communication protocol.

U.S. Pat. Nos. 5,283,783 and 5,361,250 issued to Nguyen et al. and assigned to Bay Networks, Inc., of Santa Clara, Calif., each disclose an apparatus and method for token ring beacon station removal in a communication network wherein an intelligent agent controls the detection and isolation of faulty stations in the token ring network. The method and apparatus disclosed in those patents requires that the intelligent agent be one of the stations that is included in the token ring network. This is suitable in prior concentrators such as the System 3000™ family from Bay Networks, Inc., of Santa Clara, wherein if a given intelligent agent is present in the concentrator it will be included as a station in the affected network segment.

Modern network concentrators, such as the System 5000™ family from Bay Networks, Inc., of Santa Clara, Calif., support multiple token ring backplane buses within a single chassis. For example, the above-mentioned System 5000™ supports nine (9) backplane network segments which may be variably configured for organizing ports of host modules in different slots in the concentrator into different combinations of token ring networks. Additionally, host modules inserted within such a concentrator may themselves include local networks/segments. While a System 5000™ concentrator may include a network management module (NMM) such as the one described above, the NMM may not be configured to be a station on every token ring network segment associated with the concentrator. The teachings of the above two patents are suitable for detecting and isolating stations that are beaconing in a token ring network that includes the NMM as a station, but do not provide a solution for beaconing stations involved in a token ring in which the NMM is not a participating station. It would be desirable, and is therefore and object of the present invention, to provide a method and apparatus for faulty station identification and isolation for token ring networks in which the agent responsible for detecting and isolating beaconing stations is not itself a station in the token ring network.

SUMMARY OF THE INVENTION

From the foregoing it can be appreciated that it would be desirable to provide a method and apparatus suitable for detecting and isolating beaconing stations in a token ring network wherein the agent responsible for detecting and isolating faulty stations is not itself a station within the token ring network. Accordingly, it is an object of the present invention to provide a remote token ring beacon station detection and isolation mechanism which in one embodiment is suitable for servicing multiple token ring networks or network segments. It is another object of the present invention to provide the remote token ring beacon station detection and isolation mechanism in an agent which may be stationed on some token ring networks and not a station on other token ring networks. It is another object of the present invention to provide a remote token ring beacon station detection and isolation mechanism which itself may be an agent involved in a different kind of network segment such as Ethernet or FDDI, or residing on no network segment whatsoever.

These and other objects of the present invention are provided by a mechanism for remote token ring beacon station detection and isolation. One embodiment of the present invention is implemented in a concentrator which supports multiple network segments. The concentrator may include a network management module (NMM) which may participate as a station on a subset of a network segments associated with the concentrator. For those token ring network segments in which the NMM of the concentrator is not a station, a process running on the NMM provides for remote detection functionality for beaconing stations on the remote token ring and provides commands to stations on the remote ring for isolating the problem station(s). In the described embodiment, the concentrator supports a backplane common management bus (CMB). Thus, the NMM, while not a station on the remote token ring network, may still poll stations from the remote network for fault information and provide commands to remote stations through the CMB.

For each token ring network segment associated with the concentrator, including both backplane and host module local rings, a pair of counters are maintained. One counter is incremented for received good data frames, the "good frame counter". The other counter is called a "beacon frame counter". The NMM, or any other agent carrying out the functionality of the present invention, polls these counters associated with each ring. The counters may be maintained by a processing unit associated with a host module in one of the slots of the concentrator, or other data processing technique. Only one of the stations associated with the ring needs to provide the counter information over the CMB bus to the remote agent. This station may be referred to as the "probe" station. If the probe station detects beaconing on the ring, it increments the beacon frame counter. When it provides this information to the remote agent, a beaconing station detection has occurred.

Another situation which may indicate a faulty station in a remote token ring segment is where the adjacent, upstream neighbor to the probe station is faulty. In this case, the "good frame counter" will fail to increment appropriately for a predetermined period of time. If no beacon frames have been counted, but the predetermined amount of time has elapsed and no good frames have been counted, then it can be assumed that the ring is beaconing because the probe station is not detecting good packets. This is, of course, only true if there are more than zero stations on the token ring segment. Thus, the NMM must first learn that the number of active stations on that token ring segment is greater than zero. This information may be obtained through the CMB.

Once the remote agent has determines that a faulty station exists on the affected token ring through the information provided by the counters, the remote station will begin a series of routines for isolating the faulty station or stations from the network. First, all stations that have been recently inserted into the token ring within a predetermined amount of time are wrapped. The "wrap" command is sent to the newly inserted stations over the CMB bus by the remote agent. Then, a predetermined amount of time is allowed to pass and the counters for the token ring networked are again checked. If the remote network is no longer beaconing, i.e., a good frame is detected, then it is known that at least one of the just inserted stations is faulty. The newly inserted stations may then be unwrapped one at a time. After each is unwrapped, a predetermined amount of time is allowed to elapse while the counters are checked again. Each time an unwrapped station results in a beaconing network, that station is re-wrapped until all faulty stations are wrapped and non-faulty stations are unwrapped.

At the conclusion of checking all newly inserted stations, all stations that are marked as possibly faulty are unwrapped one at a time for several repetitions. If they continue to cause beaconing, then they are permanently wrapped and marked as faulty to be fixed by a network manager. This isolates the faulty stations from that network.

If, after wrapping all newly inserted stations in the network, the network continues to include a beaconing station, then one of two different procedures is followed. For backplane rings associated with the concentrator first, all ports without stations inserted (referred to as non-phantom ports) are wrapped. This prevents any intruder stations from joining the ring during the process. Then, all RI/RO ports are wrapped. If the remote network is not beaconing, the same process applied to newly inserted station isolation is used for unwrapping the RI/RO ports, one at a time. Then, all the slots associated with the backplane ring are wrapped and then unwrapped one at a time. All the slots with a probe agent are the first ones to be wrapped and unwrapped at the backplane connection point one at a time to locate faulty slots. Then, faulty slots are checked again with all active stations wrapped. This procedure requires that at least one probe agent be connected to the backplane for collecting data frames. Then, the same two-step process is applied to all non-probe agent slots. If any slot is still wrapped then, it is subject to be permanently wrapped after a predetermined number of retries. If any ports are still wrapped, they all will be sequentially unwrapped one at a time like the process mentioned above for newly inserted stations and for RI/RO ports. A determination is made as to whether or not a beaconing station remains. This procedure continues until all beaconing stations are isolated on all slots.

For local rings, associated with one host module in the concentrator, first all ports are wrapped. Then, all ports are unwrapped one at a time until the beaconing stations are detected and isolated. This allows for the isolation of beaconing stations in local rings.

Thus, the present invention provides a mechanism for detecting and isolating beaconing stations in a token rings by an agent which is not a station within the affected ring.

BRIEF DESCRIPTION OF THE DRAWINGS

The objects, features and advantages of the present invention will be made apparent in the following detailed description in which.

DETAILED DESCRIPTION OF THE INVENTION

A method and apparatus are described for detecting and isolating faulty stations in a token ring network wherein the agent responsible for detecting and isolating the faulty stations is remote from the token ring network affected. Throughout this detailed description, numerous specific details are set forth such as time period durations and illustrative hardware suitable for utilizing the present invention. Those of ordinary skill in the art will appreciate that the present invention may be practiced without such specific details. In particular, one embodiment of a network concentrator is defined with a plurality of backplane network segments and slots for plug-in modules. It should be understood that this is for the purpose of illustration and is not provided as a limitation in that the present invention may be implemented by any remote agent capable of polling certain information from a remote token ring network and providing certain control commands to the stations within the affected token ring network.

In some instances, well-known components, structures and techniques have not been described in detail in order to avoid obscuring the subject matter of the present invention. References specifically is made to U.S. Pat. Nos. 5,283,783 and 5,361,250, issued to Nguyen et al., and both assigned to Bay Networks, Inc., of Santa Clara, Calif. (herein after "the Nguyen patents"). The Nguyen patents disclose a method and apparatus for faulty station detection and isolation in a token ring network where the agent responsible for detecting and isolating faulty stations is itself a station in the affected token ring network. The present invention relates functionality to be carried out by an agent, such as an NMM, in a concentrator which supports multiple networks. The agent or NMM of the present invention need not be a station in the affected token ring. The agent may also be involved in other networks that require faulty station detection and isolation. For detecting and isolating faulty stations in any networks for which the agent is an active station, the Nguyen patents are herein fully incorporated by reference.

Figure 1:
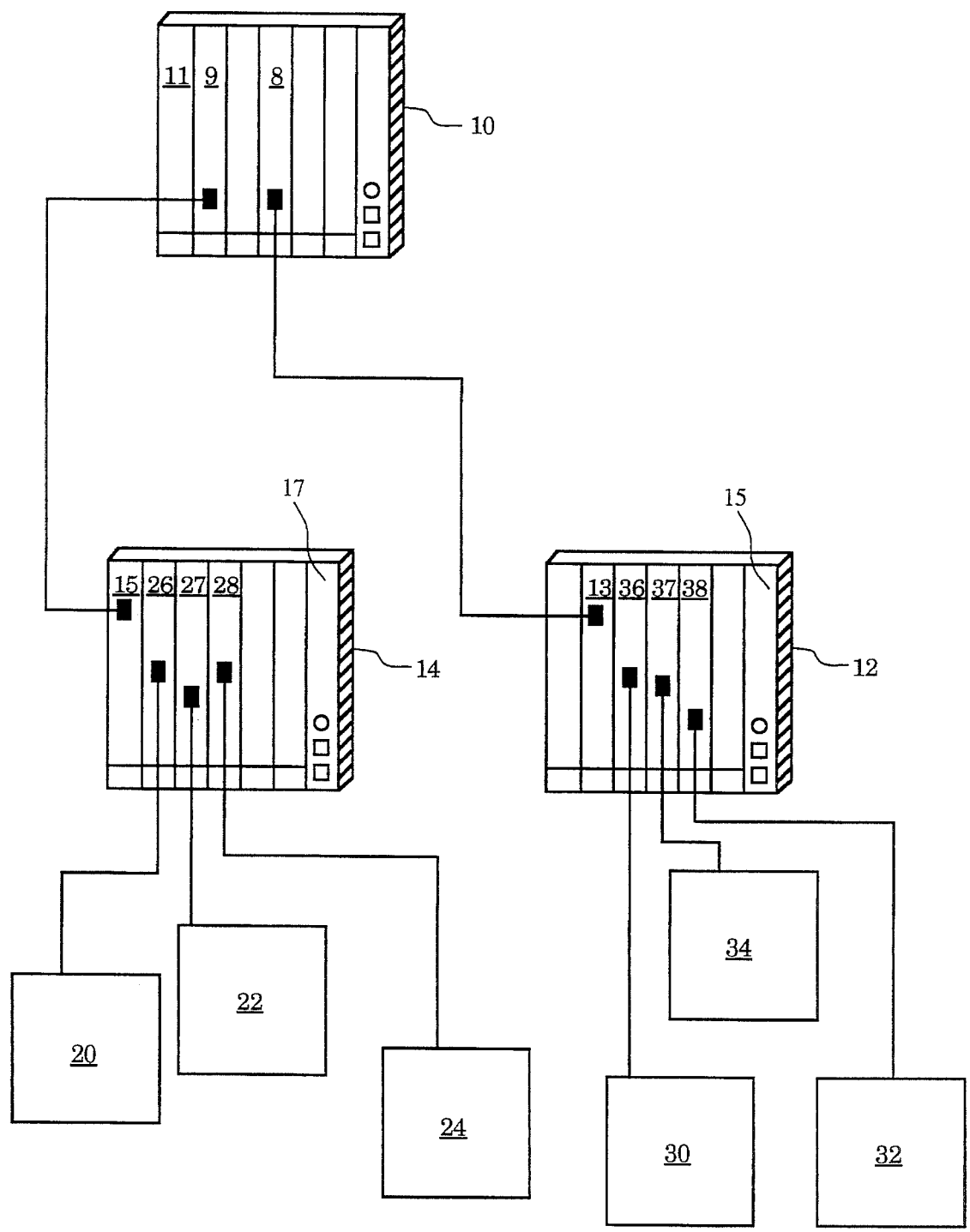
FIG. 1 illustrates a physical diagram of a typical communication network including concentrators and station linkages.

Referring now to FIG. 1, a physical linkage diagram of a typical communication network which may incorporate the present invention is illustrated. The illustrated network diagram includes three concentrators 10, 12 and 14 coupled together by conventional communications cables. Three stations are coupled to the concentrator 14. Station 20 is coupled to module 26 of concentrator 14, station 22 is coupled to module 27, and station 24 is coupled to module 28. Stations 30, 32 and 34 are coupled to modules 36, 37 and 38 in concentrator 12, respectively.

The concentrator 12 is illustrated having a network management module (NMM) 15. In prior art network configurations, such as the one in the above referenced Nguyen patents, the NMM 15 of concentrator 12 would have been a participating station in the token ring topology of the network defined by the configuration shown. In accordance with the present invention, the concentrator 12 may be a concentrator which supports multiple backplane networks (not shown) wherein the NMM 15 may participate in some token ring network segments associated with the concentrator, but not others. For network segments in which the NMM is a participating station, the teaching of the Nguyen patents provides a solution for detecting faulty stations in the network and isolating them. For purposes of the present invention, it is assumed that the NMM is not a station within a token ring network of interest which may have faulty stations incorporated therein.

The functionality to be described further herein to be carried by the NMM 15 should be understood to be functionality that could be incorporated in another agent that is remote from the token ring network of interest, but which is capable of receiving information and supplying commands to the stations of the token ring network. For example, the concentrator itself may incorporate some supervising logic and not require an NMM module to carry out these functions. Not illustrated in FIG. 1 is that in addition to a plurality of backplane buses associated with the concentrator 12 for configurating networks, there is also a common management bus. The common management bus (CMB) is the mechanism by which information from stations in a remote token ring network may be provided to the NMM 15 or other remote agent. Similarly, the common management bus provides a mechanism for the NMM 12 or other agent to propagate control commands to the stations of the remote token ring network. It is these features of the concentrator which allow the NMM 15 to carry out the functionality of remote token ring faulty station detection and isolation.

Figure 2:
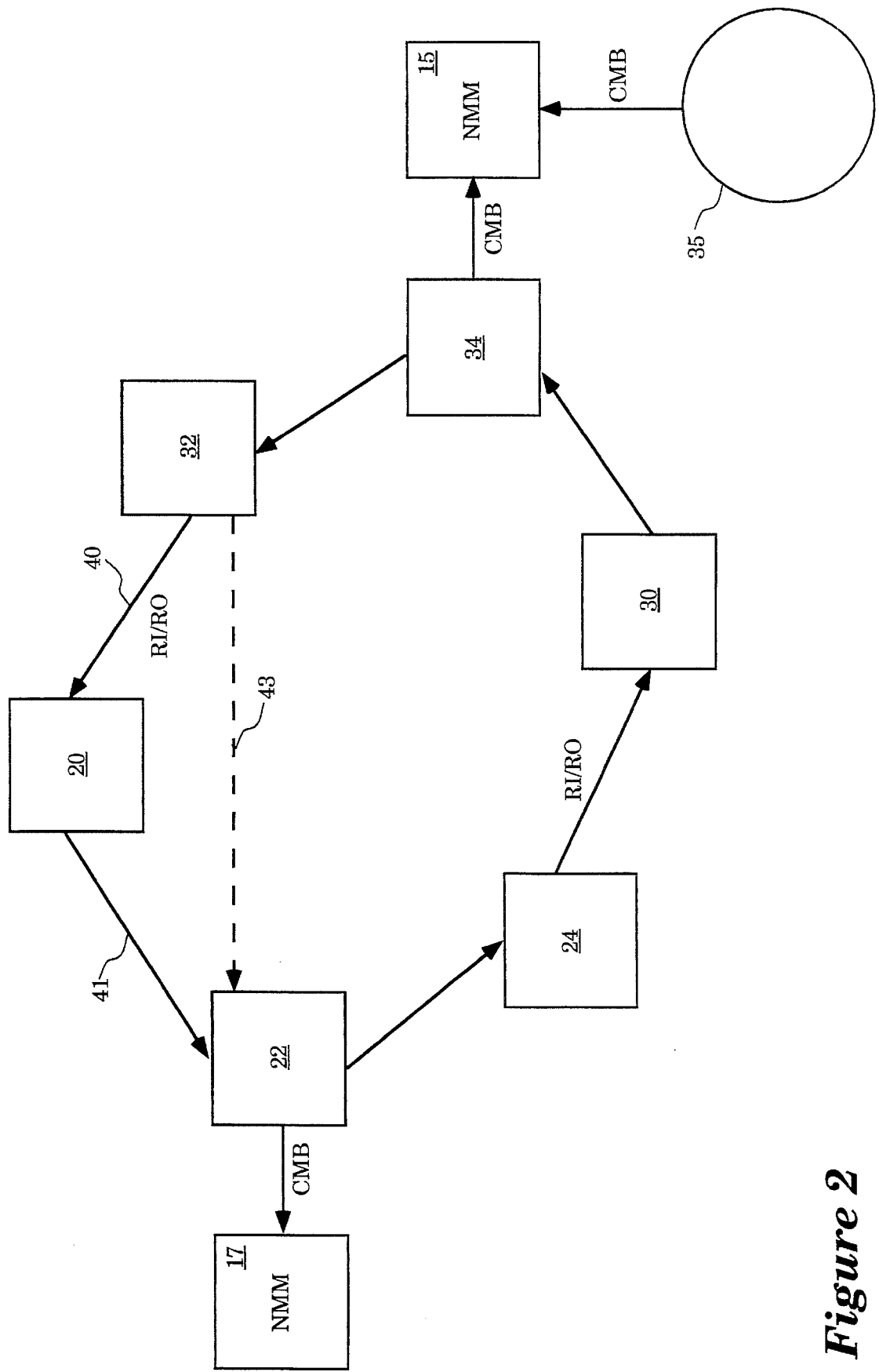
FIG. 2 illustrates a logical diagram showing a communication ring representing a token ring network topology generated based on the communication linkages of FIG. 1.

Referring now to FIG. 2, a functional topology of the network system of FIG. 1 is illustrated. The topology of concern for the present invention is a token ring topology, and therefore the six stations of the network are configured within the concentrators to be arranged in the ring structure as shown. Communication within the token ring network will travel in the direction indicated by the arrows between each station. Messages that traverse this token ring system primarily include the token that is passed between stations, data frames and network control packets. These messages may be referred to as communication traffic. Within the given token ring, one station, such as station 34, will be denoted as a "probe" station which will provide information to the remote NMM 15 over the CMB bus of their shared concentrator 12 so that the remote NMM may monitor for faulty stations within the token ring.

In accordance with one embodiment of the present invention, the NMM may perform its monitoring functions for additional token rings in which it is not a resident station such as the second ring structure 35. Each ring associated with the concentrator may have its fault condition status monitored by the NMM 15 even if the NMM 15 is not a station within the ring.

It is noted that the ring structure of FIG. 2 involved stations coupled to two separate concentrators 12 and 14, through a third concentrator 10 (FIG. 1). The concentrator 14 may also include an NMM 17 which shares a CMB bus with the stations associated with the concentrator 14 for receiving fault status information and providing commands to stations associated with the concentrator 14.

One further point of nomenclature worth noting is that the couplings between concentrators are made through Ring In/Ring Out (RI/RO) ports associated with the concentrator. Thus, in FIG. 2, connections for the illustrated ring structure which couple adjacent nodes in the network that are present on different concentrators are illustrated as being made through RI/RO connections.

A goal of the present invention is to identify and isolate problem stations causing communication faults in a given token ring topology. Therefore, in the example of FIG. 2, assuming station 20 was problematic within the network system, the present invention would identify station 20 as the problematic station and then communicatively isolates station 20 from the network. Isolation (also referred to as wrapping) is performed within a concentrator via bypassing the problematic station. For instance, communications paths 40 and 41 would be temporarily interrupted and a new path shown by dashline 43 would be installed between stations 22 and 32 with station 20 being isolated (wrapped). Stations 32 and 22 would then become neighbor stations with station 32 being the upstream neighbor of station 22. Station 20 is thus isolated from the network. In this way, the problems of station 20 will not cause the entire token ring network to shut down. Station 20 would then be identified for later troubleshooting.

Referring still to FIG. 2, assuming station 20 is faulty, then no communication will traverse through path 41 to station 22. The present invention will realize that no token data frames are traversing path 41 to station 22 since node 22 is not receiving tokens after predetermined time-out periods. After a predetermined time-out period has passed in which no tokens are received by station 22, station 22 will begin to issue beacon data frames and is called a beaconing station; station 22 is beaconing to indicate some fault over the network because station 22 has not received the token data frames in an excess of a predetermined period. The other stations in the networks will repeat this beacon data frame from station 22 as well as generate separate beacon data frames of their own. Each station that receives a beacon data frame from another upstream station will automatically stop generating beacon data frames of its own and merely repeat the beacon data frame of its upstream neighbor station. In so doing, after a short period of time, only the station adjacent to a faulty station will remain beaconing while the other stations will merely repeat the beacon data frames from the station 22. By way of terminology, the station beaconing is called the beaconing station and the address of the station upstream from the beaconing station is called the upstream neighbor address or UNA.

Figure 3:
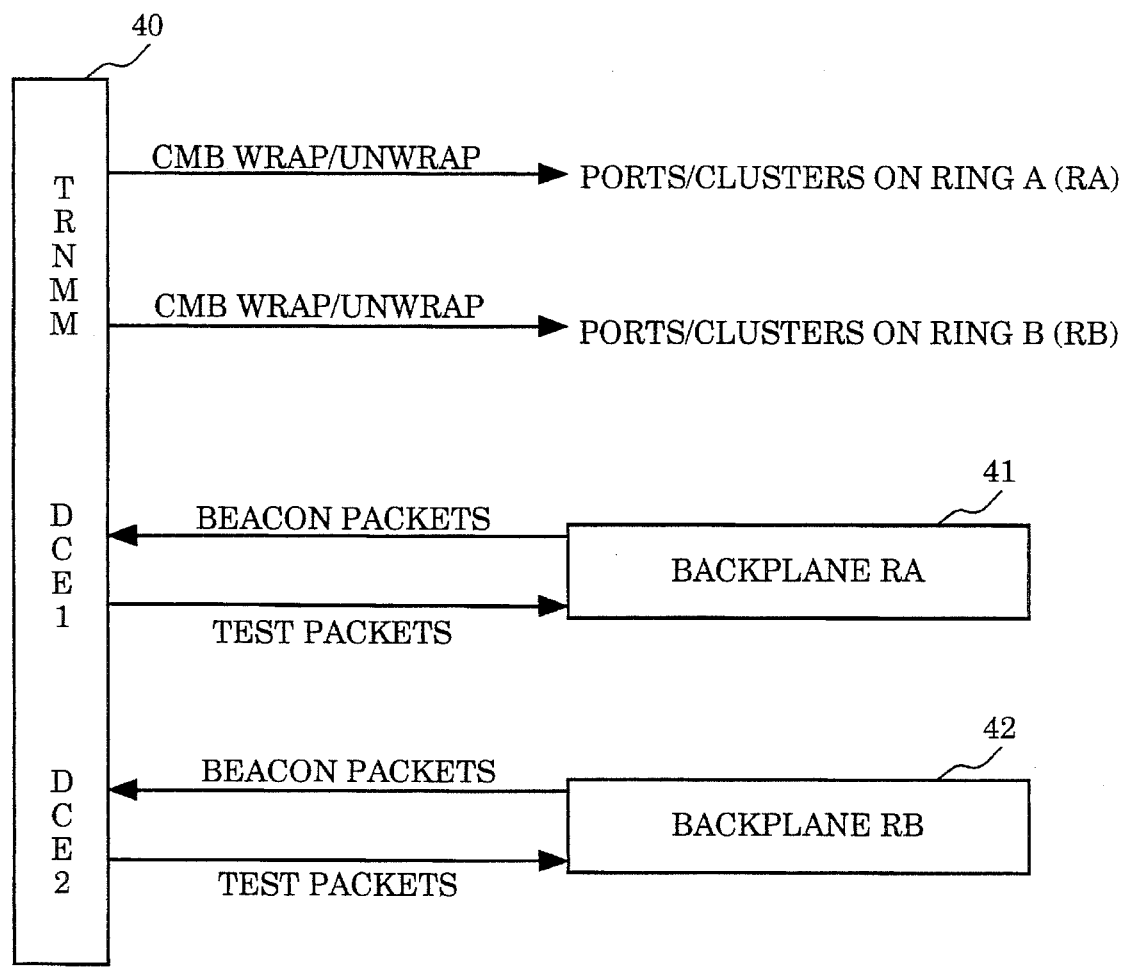
FIG. 3 illustrates a logical communication exchange for automatic beacon removal where a network management module is a station within the beaconing token ring.

The above described conditions of a beaconing station in a token ring are consistent with the teachings of the above noted Nguyen patents. However, the above noted Nguyen patents assume the situation in which the agent responsible for detecting and isolating faulty stations in a token ring is itself a station inserted within the token ring. This is illustrated logically by FIG. 3 which shows a situation in which a token ring NMM (TRNMM) 40 is coupled to two backplane rings, (Ring A) RA and (Ring B) RB 41 and 42, respectively. It can be seen that in the prior art, the token ring NMM 40 will know almost immediately when the token ring associated with either backplane RA or backplane RB is beaconing because it will itself receive beaconing packets as communication traffic along the token ring in which it is involved. FIG. 3 illustrates that the TRNMM 40 is capable of receiving and propagating data packets circulating through both rings A and B independent of its background connections through the CMB bus. As described in the above referenced Nguyen patents, the commands of interest which are propagated over the CMB bus are commands for wrapping and unwrapping ports of the concentrator in which the NMM is present.

Figure 4:
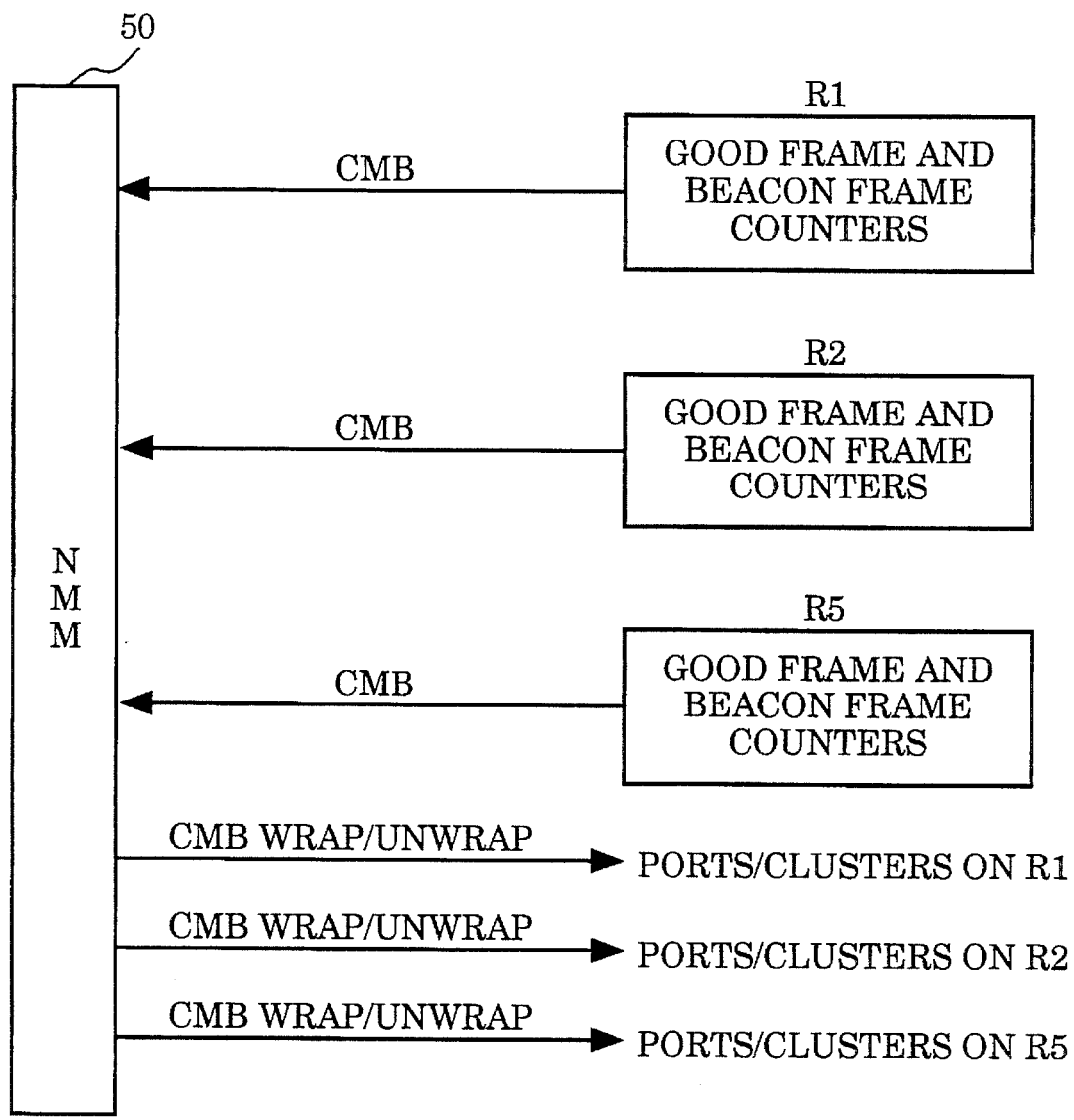
FIG. 4 illustrates a communication model where a network management module is in communication with a remote token ring for carrying out remote automatic beacon removal.

FIG. 4 illustrates the network architecture of interest for the present invention. In this case, a concentrator will include an NMM 50 for carrying out the functionality to be described below. As noted above, an agent other than one associated with an NMM may be used for executing the functionality of the present invention as an alternative to an NMM module in the concentrator. The configuration illustrated in FIG. 4 highlights that the NMM 50 is an agent that is not a station incorporated within any of the three rings which are identified as R1, R2 and R5 to which it is responsible for managing. Any one of token ring networks R1, R2 and R5 may at some time include a faulty station which needs to be detected by the NMM 50 and isolated from its respective token ring.

As described above, a concentrator in accordance with the present invention will provide a backplane common management bus (CMB) for communication between elements within the concentrator whether they are included in the same network segment or not. FIG. 4 illustrates that the NMM 50 may receive information over this CMB bus from each of the token rings R1, R2 and R5 for which it is managing. As will be described below, each of the token rings will have associated with it one station or other agent which maintains counters for identifying both good data frames and any beacon data frames traversing the affected ring. It is this counter information which is provided to the remote NMM which the NMM agent uses to determine whether or not a token ring network is beaconing. The NMM is able to provide instructions over the CMB backplane bus to stations on the networks which it is managing. This allows the NMM to provide instructions for wrapping and unwrapping various stations in a given token ring for the purposes of identifying and isolating faulty stations. Thus, it can be seen that the NMM 50 may manage multiple token ring networks even though it is not itself a station on any of the token ring networks.

Figure 5:
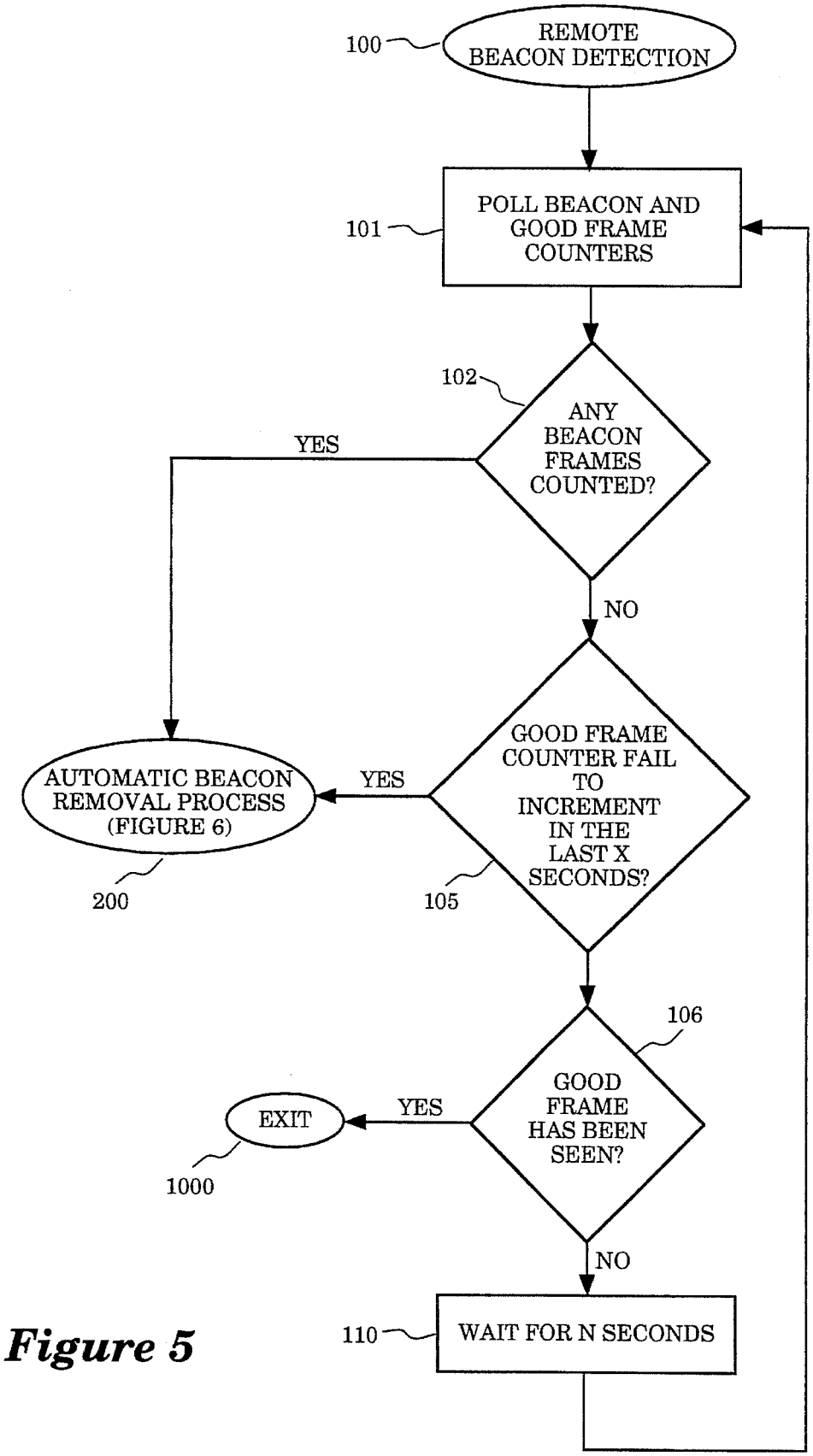
FIGS. 5 illustrates a flow diagram for the remote beacon detection process in accordance with the remote agent procedures of the present invention.

The following references to FIGS. 5–11 will describe the processing flow for a remote agent such as a concentrator NMM for faulty station detection and isolation in token rings networks in which the NMM itself is not a station. As has been described above, associated with each token ring network, two counters are maintained, the beacon frame counter and the good data frame counter which may be maintained by one of the stations in the token ring network or by some associated logic with the hardware for supporting the token ring networks. FIG. 5 illustrates the initial task flow diagram for detecting beaconing in a remote token ring network. The Remote Beacon Detection Routine 100 begins at step 101 by polling the beacon and good frame counters from the token ring network of interest. The counter information is provided to the remote NMM over the CMB backplane bus. The overall process of remote beacon detection 100 of FIG. 5 is a periodic task that checks the beacon/good frame counters with a periodicity calibrated for the counter update latency of the network.

After polling the beacon frame and good frame counters at step 101, a determination is made at decision box 102 whether any beacon frames have been counted on the remote network. If so, the routine proceeds to the Automatic Beacon Removal Process 200 to be described further herein with respect to FIG. 6. There is another case other than the beacon frame counter which can indicate that a remote token ring is beaconing. It is possible that the faulty station in the ring prevents the beacon data frames from reaching the station or agent responsible for incrementing the beacon frame counter. Accordingly, the NMM maintains a record for each time it polls the remote ring which indicates the previous value of the good frame counter which should increment every time a good frame of data is received. If, after a period of X seconds, the good frame counter has failed to increment, it can be assumed that the ring is beaconing and that beacon data frames have been prevented from reaching the station responsible for incrementing the ring's counters. The period of X seconds should be long enough to ensure the reliability of the determination mode. In one embodiment, X seconds comprises 7 seconds plus the overhead time required. If this determination is made at the decision box 105, then again the automatic beacon removal process 200 is initiated.

If after decision boxes 102 and 105, at decision box 106 no good frame is seen, then the periodic function of beacon detection pauses at step 110 for a predetermined amount of time illustrated as N seconds. N may be an arbitrary period so long as it is long enough to account for a complete communication cycle around the ring and account for latency of updating the counters and polling over the CMB bus. For example, if it is determined that that procedure could take up to three seconds, N might be established to be five seconds. After waiting for N seconds at step 110, the procedure returns to step 101 where again the beacon and good frame counters are polled by the remote agent.

As was described above with respect to FIG. 4, the remote NMM may be responsible for faulty station detection and isolation on multiple rings. Thus, the NMM agent will maintain a table for each of the token rings it is monitoring that remembers the last action taken through the periodic procedure. For example, if a port is wrapped, as will be described below, the slot and port information of the last wrapped port will be maintained in the table for the entry corresponding to the given remote token ring being managed.

Figure 6:
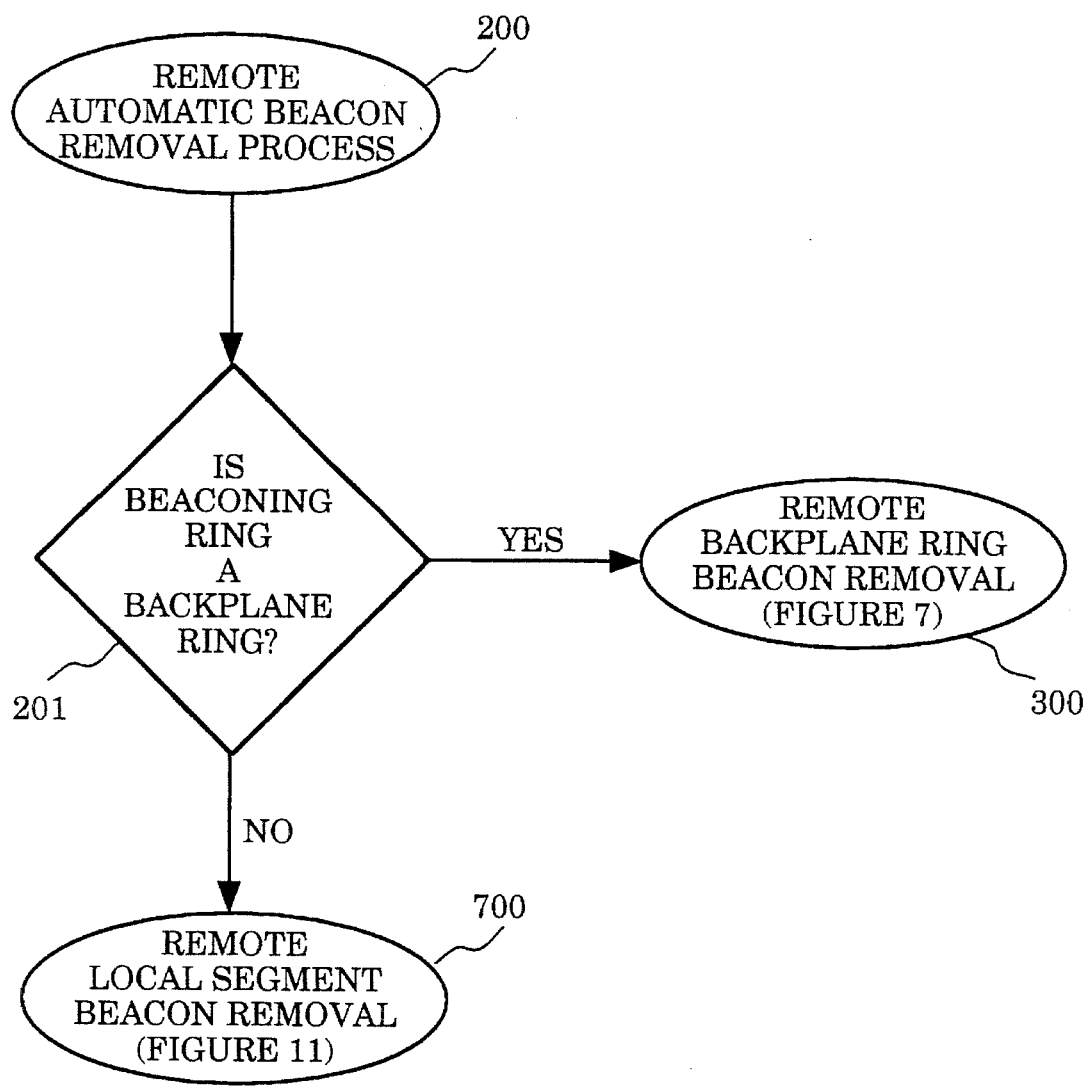
FIG. 6 illustrates the general automatic beacon removal process in accordance with a remote agent executing the routines of the present invention.

Referring now to FIG. 6, the general flow diagram for the Remote Automatic Beacon Removal Process 200 is described. At this point it is noted that beaconing rings are split into two groups, backplane rings and local rings. The backplane ring automatic beacon removal process is executed for logical rings associated with the concentrator backplane network segments. The local ring automatic beacon removal process is executed per slot within the concentrator. Thus, a first step in the Remote Automatic Beacon Removal Process 200 is the determination made at decision box 201 as to whether or not the beaconing ring is a backplane ring. If it is, the procedure branches to the Remote Backplane Ring Beacon Removal Process 300 which will be described next with respect to FIG. 7. If the beaconing ring is determined to be a local segment in one of the slots of the concentrator, the routine then branches to the Remote Local Segment Beacon Removal Process 700 to be described below with respect to FIG. 11.

Figure 7:
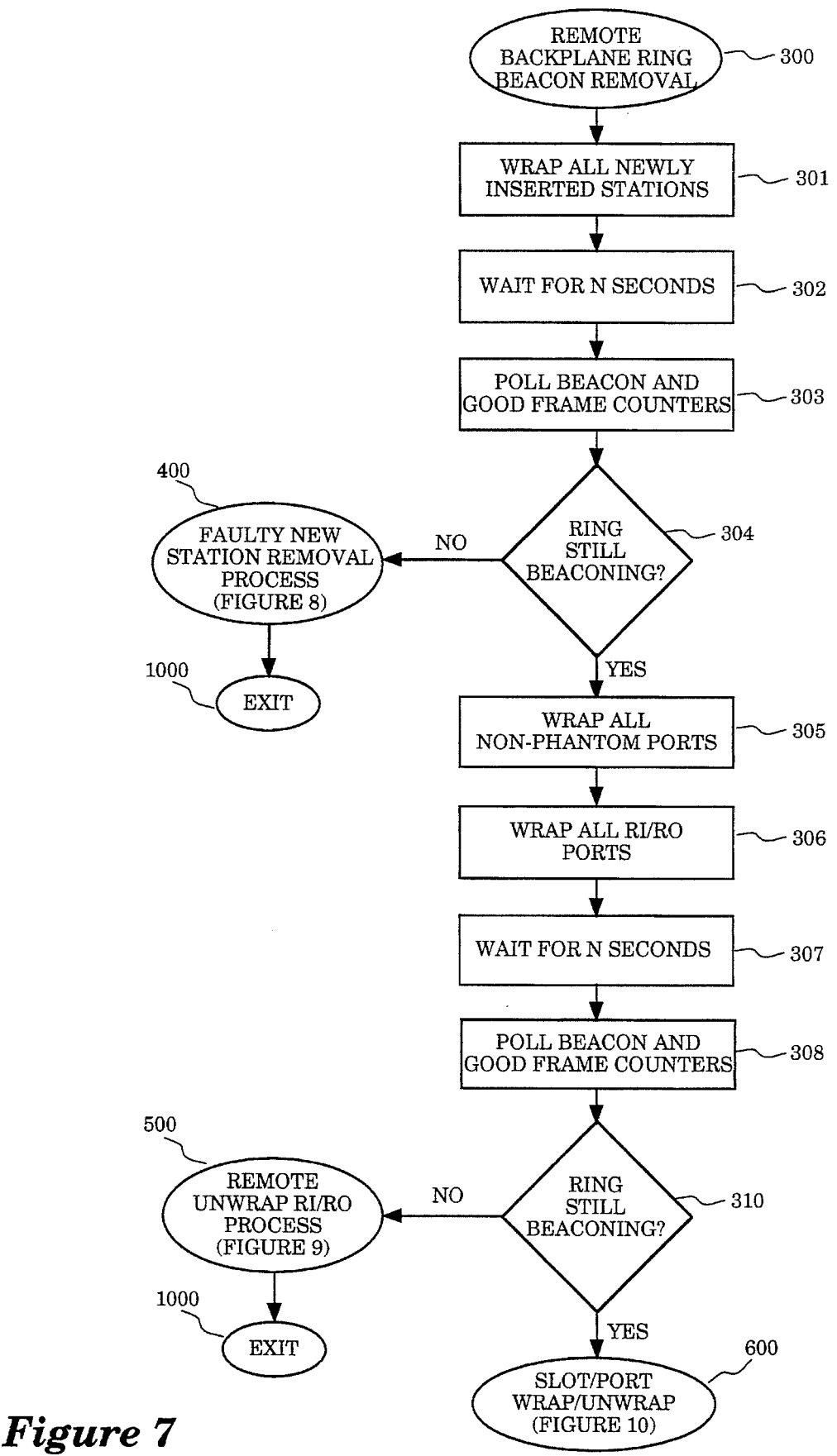
FIG. 7 illustrates a task flow diagram for the backplane beacon removal process for isolating faulty stations associated with a concentrator's backplane ring segments.

Referring now to FIG. 7, the Remote Backplane Ring Beacon Removal Procedure 300 will be described. The first step at box 301 is to wrap (isolate) all newly inserted stations, also referred to as unknown stations. A newly inserted station may be one defined to have been only added to the remote token ring network within a predetermined recent period of time such as within the last 20 seconds. Such information is maintained by a periodic task that polls all the host modules to get updated information periodically. After wrapping all newly inserted stations, at step 302 the procedure must wait for N seconds, where N is defined as above, before polling the ring's beacon and good frame counters at step 303. This allows for a correct determination at decision box 304 as to whether or not the remote token ring network is still beaconing after the newly inserted stations have been wrapped. If the ring is no longer beaconing after wrapping all newly inserted stations, then the Remote Backplane Beacon Removal Process 300 branches to the Faulty New Station Removal Process 400 to be described below with respect to FIG. 8.

If, after wrapping all newly inserted stations, the remote token ring network is still beaconing at decision box 304, then at step 305 all non-phantom ports (empty ports) are wrapped to prevent intruder stations from being inserted during the process. Then, at the next step in the procedure 306, all ring-in/ring-out (RI/RO) ports are wrapped. It is most common that ring beaconing comes from nodes outside of the concentrator which are passed to the concentrator through the RI/RO ports. After wrapping all RI/RO ports at step 306, the procedure waits at step 307 for the predetermined N seconds and then at step 308 polls the beacon and good frame counters again from the network of interest. If at decision box 310 it is determined that wrapping the RI/RO ports eliminated the ring beaconing, then the procedure branches to the Remote Unwrap RI/RO Process 500 to be described further below with respect to FIG. 9. If wrapping the RI/RO ports of the token ring network segment still does not resolve in the beaconing of the remote token ring network, then the procedure branches to the Slot/Port Wrap/Unwrap Process 600 which will be described in further detail below with respect to FIG. 10.

Figure 8:
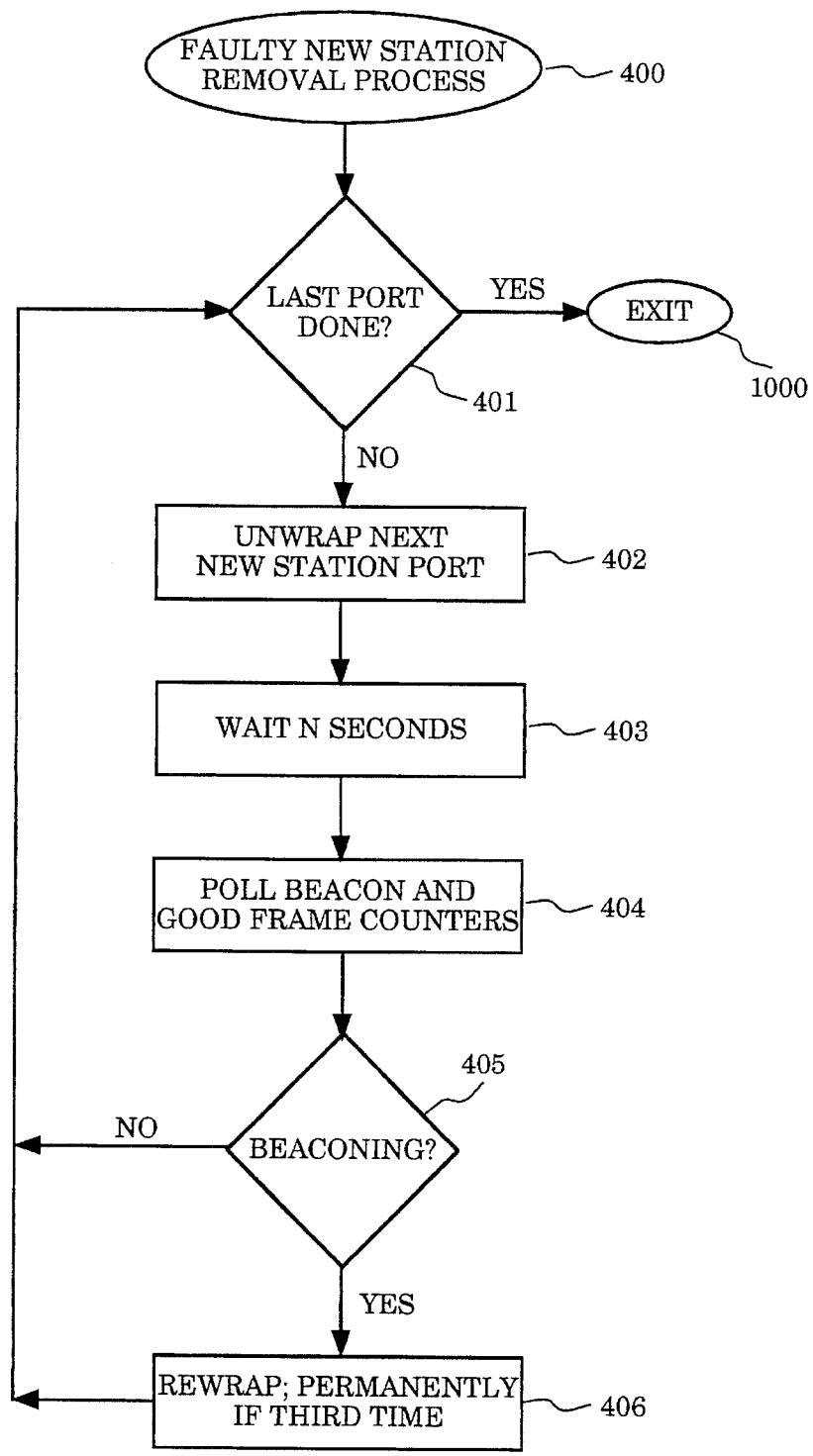
FIG. 8 illustrates the faulty new station removal process for isolating newly inserted faulty stations in a token ring network in accordance with the present invention.

Referring now to FIG. 8, a procedure for removing a faulty new station is described. The Faulty New Station Removal Process 400 was branched to when it was determined that by wrapping all newly inserted stations, the beaconing of the affected token ring ceased. The Faulty New Station Removal Process 400 is a process for isolating which newly inserted station or stations is responsible for beaconing while replacing the rest back into the token ring network. The procedure 400 is an iterative process so the first task at step 401 is a decision box for determining whether all of the ports associated with newly installed stations have been checked. If so, the procedure exits. At step 402, the "next" newly inserted station port is unwrapped. The basis for determining what station is next may follow any number of methods, including by port number within a given slot or by address, or other basis. After the next newly installed station port is unwrapped at step 402, the procedure waits for the N seconds step 403 to allow traffic to traverse the affected ring. Then, at step 404 the beacon and good frame counters are polled from the affected network over the CMB bus. At decision box 405, a determination is made based on the counter values as to whether or not the token ring has begun beaconing again. If has not, that port is left unwrapped and the procedure returns to decision box 401. If the ring has begun beaconing again, the port is rewrapped at step 406 before returning to decision box 401. Further, at step 406, a determination is made as to whether or not the same port has had three (or other configurable number) attempts at being unwrapped. It is recognized that some data communication errors which may lead to beaconing may resolve themselves after steadying over a period of time. In accordance with the present invention, an arbitrary attempt count of three is established such that after an unwrapped port has caused beaconing three times, it is permanently wrapped and marked for attendance by a network manager. The NMM may maintain counters associated with each port for determining how many times a given port has been allowed to cause beaconing in the ring. Once all the newly inserted stations have been unwrapped or rewrapped, the procedure exits. If the network later resumes beaconing, the main procedure 100 will again branch to the Automatic Beacon Remote Process 200.

Figure 9:
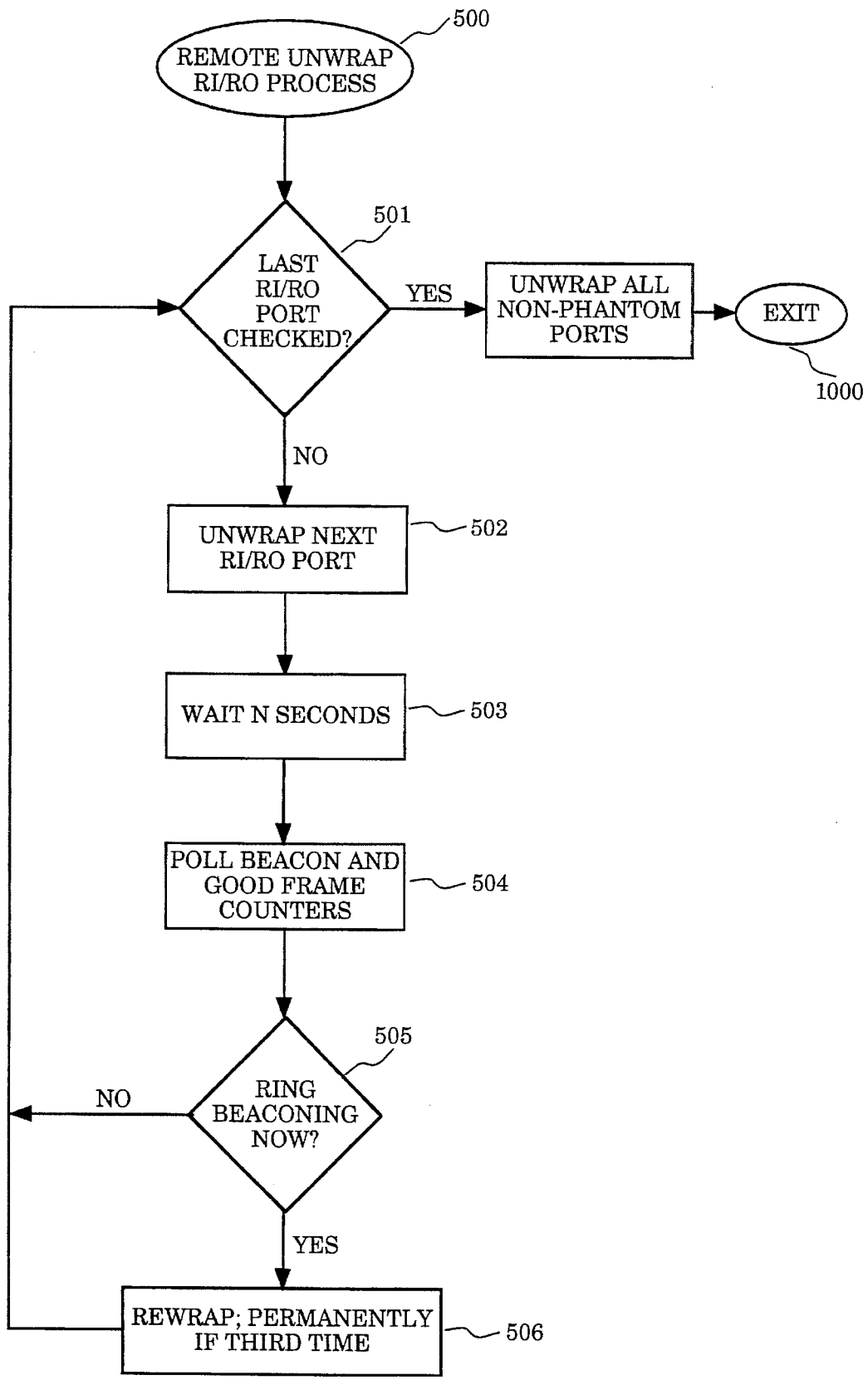
FIG. 9 illustrates a task flow diagram for determining if ring-in/ring-out ports of a token ring concentrator are faulty and need to be isolated.

FIG. 9 illustrates the process flow for the Remote Unwrap of RI/RO Process 500. The unwrapping of the ring in/ring out ports is an iterative process which is reached when it is determined that the ring beaconing was a result of stations associated with the RI/RO ports. Because it is an iterative process, the first step is at decision box 501 to determine if the last RI/RO port has been checked. If it has, the procedure exits. When the process proceeds, the next step is at box 502 where the next RI/RO port is unwrapped. The procedure then waits for N seconds at step 503 before polling the beacon and good frame counters at step 504 over the CMB bus. It is then determined at decision box 505 based on the polled counter values whether or not the token ring network has resumed beaconing. If it has not, the current RI/RO port is left unwrapped and the routine returns to decision box 501 to either exit or unwrap the next RI/RO port.

If at decision box 505 it was determined that the unwrapping of a particular RI/RO port resulted in token ring beaconing of the network, the procedure continues to step 506. At step 506, the current RI/RO port is rewrapped. If the port had been previously unwrapped two other times, then the wrapping at step 506 is a permanent wrap with the port being marked for attendance by a network manager. The routine then returns to decision box 501 to either exit or unwrap the next RI/RO port. Even though one RI/RO port may have been determined to be faulty, it is possible that others of the RI/RO ports are faulty as well. The iterative procedure proceeds through each of the RI/RO ports associated with the token ring network of interest.

Figure 10:
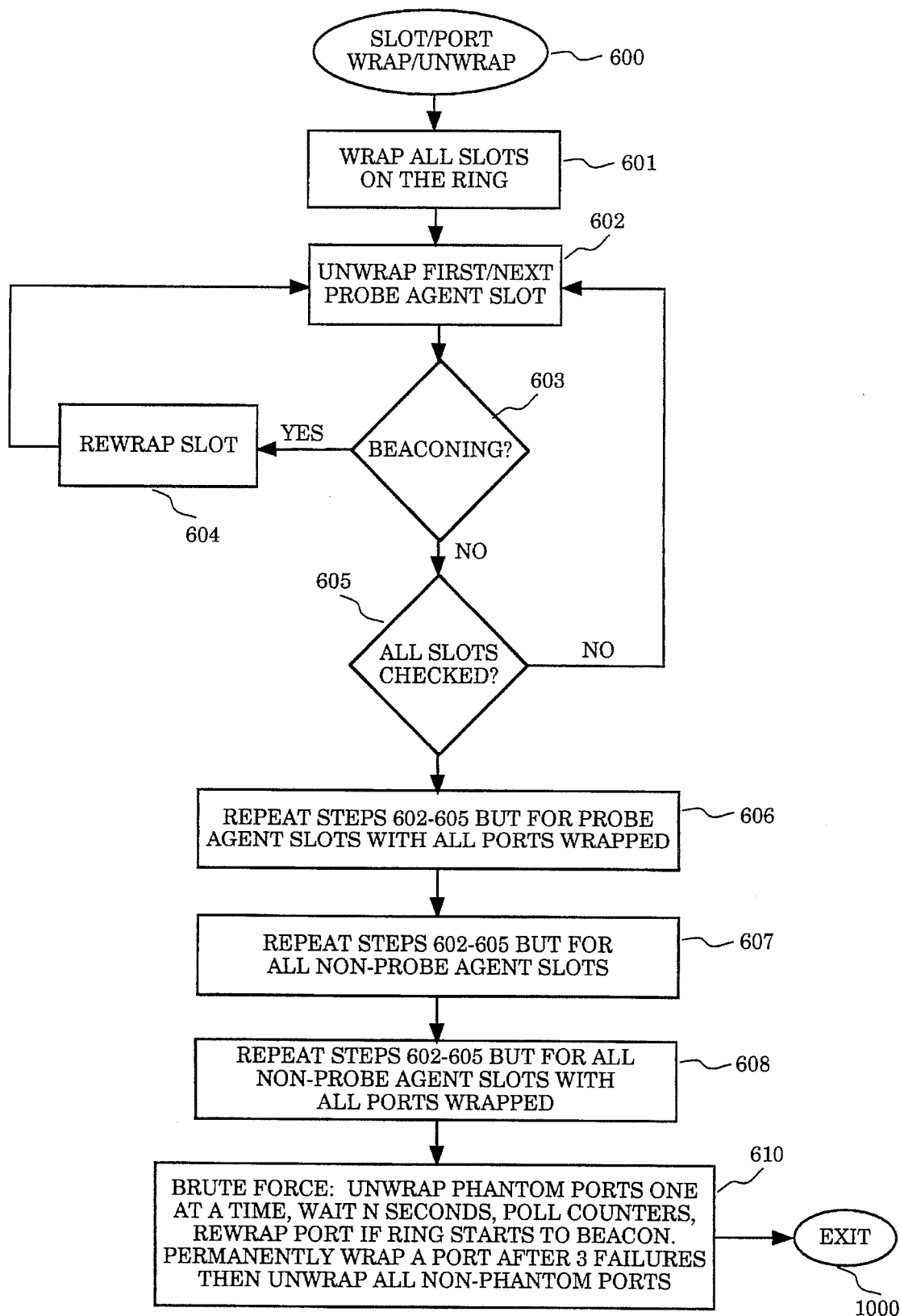
FIG. 10 illustrates a task flow diagram for an iterative faulty station isolation procedure in accordance with the present invention.

Reference is now made to FIG. 10. The procedure illustrated in FIG. 10 is identified as the Slot/Port Wrap/Unwrap Procedure 600. This routine is reached if after wrapping all of the newly installed stations in the token ring network and the ring in/ring out ports, the token ring network continues to exhibit a beaconing characteristic. The first step in procedure 600 is to wrap all of the slots on the token ring network at step 601. Before testing whether or not any station is faulty in the beaconing token ring, the procedure 600 first determines whether or not any slots in the concentrator are responsible for the token ring beaconing. As explained, multiple slots may be involved with the token ring through one of the backplane buses within the concentrator. Accordingly, the first portion of the procedure is to iterate through the slots affiliated with the network segment without unwrapping the ports to determine if a slot itself is causing beaconing. The process for detecting faulty slots is itself divided into four routines. First, all slots with probe agents are the first to be wrapped and sequentially unwrapped to locate faulty slots. Then any faulty slots are checked again with all the active stations wrapped. Then, the same two-step process is repeated for all non-probe agent slots.

The faulty slot detection routine which will be repeated for each of the above described situations begins at step 602 where the first or next slot (probe agent slots on the first pass) associated with the network is unwrapped. If at step 603 it is determined that unwrapping a slot on the segment yielded beaconing, then the slot is rewrapped at step 604. The test for beaconing is the same one that has been described above. A delay of N seconds is allowed to pass and then the beacon and good frame counters for the network are polled by the remote agent. After rewrapping a faulty slot, the procedure returns to step 602 to unwrap the next slot affiliated with the token ring network.

If the network does not beacon after decision box 603, the routine proceeds to decision 605 where it is determined whether or not all of the slots of the currently being tested type have been checked. If not, the current slot is left unwrapped and the routine returns to step 602 to unwrap the next slot associated with the segment.

Once the first pass through the faulty slot detection loop steps 602–605 has completed, those very same steps are executed at step 606, but this time for probe agent slots with all ports wrapped. Then, at steps 607 and 608, the routines are repeated again for the non-probe agent slots twice, the second time with all active stations wrapped. Finally, for all ports that remain wrapped, a brute force method is applied at step 610. Essentially that brute force method is an iterative process wherein all ports are first wrapped and then unwrapped one at a time. The delay period of N seconds is allowed to elapse and then the network counters are polled by the remote NMM after each port is unwrapped. If the newly unwrapped port has resulted in beaconing, the port is rewrapped, permanently if it was the third time. This procedure continues to iterate through each of the ports in the network until all faulty ports have been isolated and all functioning ones are unwrapped. At the conclusion of the brute force step 610, all non-phantom ports are unwrapped. The procedure then exits.

Figure 11:
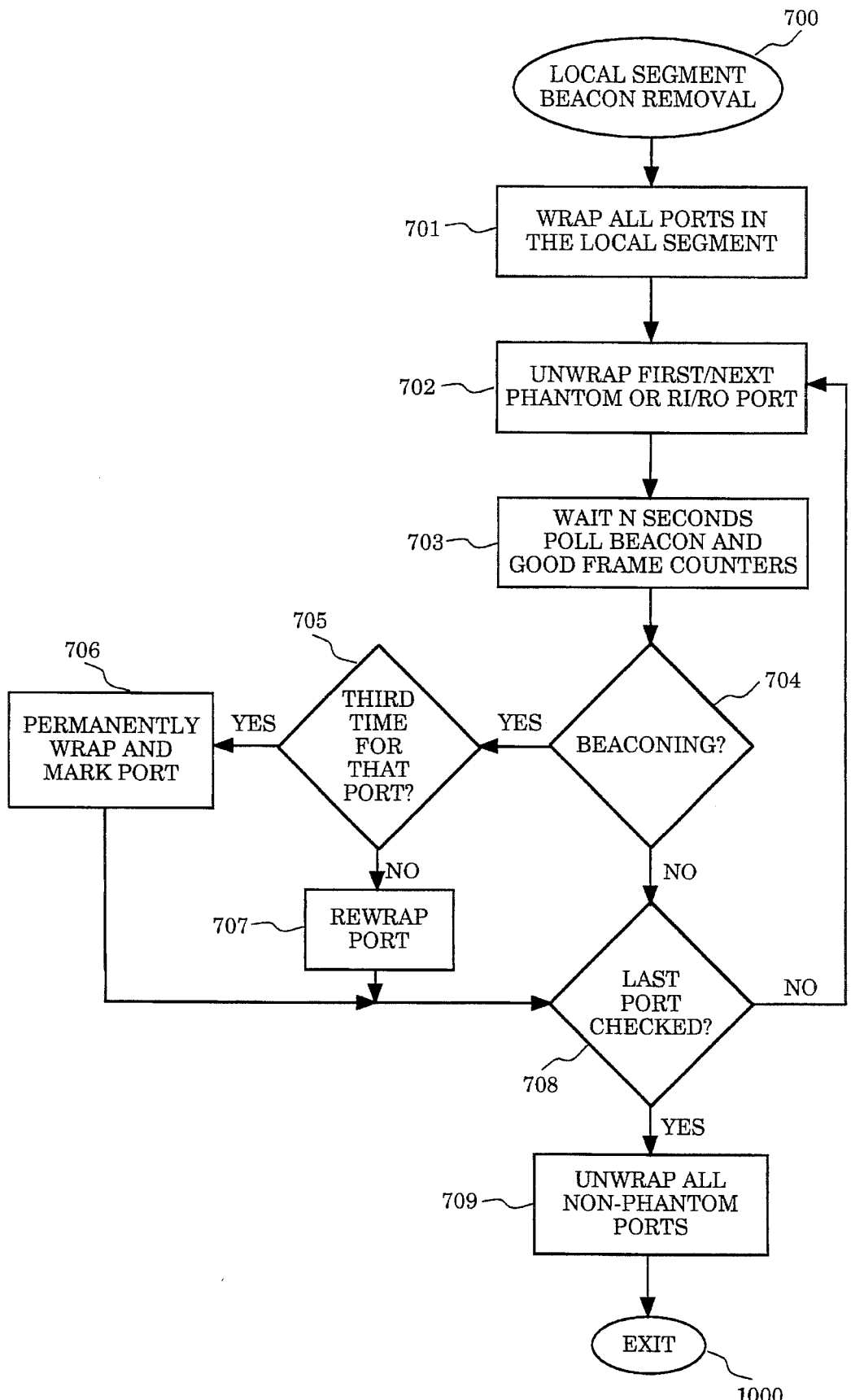
FIG. 11 illustrates a task flow diagram for removing faulty stations from a beaconing token ring which is associated with a local segment in a token ring concentrator.

Referring now to FIG. 11, the Local Segment Beacon Removal Procedure 700 to be carried out by the remote NMM is illustrated. This procedure is executed when the token ring is beaconing and it is determined that the network is a network segment associated with a single local token ring. First, all ports of the local segment are wrapped at step 701. At step 702, the first or next phantom port or RI/RO port is unwrapped. At step 703, an N second delay is allowed before the beacon and good frame counters for the local segment are polled by the remote NMM. At decision box 704, a determination is made based on the counter values as to whether or not the ring has resumed to beaconing. If it has, and at step 705 it is determined that it was the third time that that particular port had yielded beaconing when unwrapped, then at step 706 the port is permanently wrapped and marked for attendance by the network manager. If it was not the third time that the current port had caused beaconing when unwrapped, then it is rewrapped at step 707 and its attempt count may be incremented until the third time is reached. The procedure then proceeds to decision box 708. At decision box 708, if the last port has not yet been checked, the routine returns to step 702 where the next phantom or RI/RO port is unwrapped. Once all phantom and RI/RO ports have been checked, the routine proceeds from decision box 708 to step 709. At step 709, all non-phantom ports of the local segment are unwrapped and the automatic beacon removal process for the local segment is complete and the procedure exits.

There has thus been described a method and apparatus for faulty station detection and isolation in a token ring network or multiple token ring networks wherein the agent responsible for detecting and isolating the faulty stations in the network is itself not a station within the network. Although the present invention has been described in terms of preferred and implemented embodiments, this is by way of illustration only. Accordingly, the scope of the present invention should be determined in light of the claims which follow.

What is claimed is:

1. An apparatus for managing a token ring network, wherein said token ring network comprises a plurality of stations coupled in a ring topology, said apparatus comprising:

a beacon frame counter for counting beacon data frames traversing said token ring;

a good frame counter for counting good data frames traversing said token ring;

a management bus coupled to said token ring for conveying count information from said beacon frame and good frame counters; and a remote management agent coupled to said management bus for receiving count information from said beacon frame counter and said good frame counter, said remote management agent periodically polling said counters at a frequency of a first predetermined amount of time, said remote agent determining said token ring is beaconing if said beacon frame counter increments between periodic pollings.

2. The apparatus of claim 1 wherein remote management agent comprises a memory mechanism for remembering a previous count information for said good frame counter, said remote management agent determining said token ring is beaconing if said good frame counter fails to increment for at least twice said predetermined amount of time.

3. The apparatus of claim 2 wherein said management bus further comprises signal lines for propagating control commands to said plurality of stations coupled in said token ring.

4. The apparatus of claim 3 wherein said control commands include wrap and unwrap commands for wrapping and unwrapping elements of said token ring network, respectively.

5. The apparatus of claim 4 wherein said plurality of stations are coupled to a common concentrator which incorporates said management bus, each of said stations being coupled through a coupling port of a module in a slot of said concentrator, said remote management agent, upon determining that said token ring is beaconing providing commands to the concentrator for isolating a faulty station causing said beaconing.

6. The apparatus of claim 5 wherein said concentrator supports token ring networks of a first type and a second type, said remote management agent including a first processing means for beacon removal from token ring networks of said first type and a second processing means for beacon removal from token ring networks of said second type.

7. The apparatus of claim 6 wherein said token rings of said first type are backplane rings and token rings of said second type are local segment token rings associated with a single slot in said concentrator, said first processing means comprising:

means for wrapping all newly inserted stations in said token ring; and means for isolating faulty newly inserted station from said token ring network, said means operable when said token ring network ceases beaconing after wrapping all newly inserted stations.

8. The apparatus of claim 7 wherein said means for isolating faulty newly inserted stations comprises:

means for iteratively unwrapping said newly inserted stations one station at a time;

means for determining if a newly unwrapped station causes said token ring network to resume beaconing; and means for rewrapping newly inserted stations which cause the token ring network to resume beaconing when unwrapped.

9. The apparatus of claim 7 further comprising:

means for wrapping all ring-in/ring-out (RI/RO) ports in said concentrator associated with said token ring network; and means for isolating RI/RO ports which cause said token ring network to beacon, said means operable when said token ring network ceases beaconing after wrapping all RI/RO ports.

10. The apparatus of claim 9 wherein said means for isolating RI/RO ports comprises:

means for iteratively unwrapping said RI/RO ports one port at a time;

means for determining if said token ring network has resumed beaconing; and means for rewrapping RI/RO ports which cause the token ring network to resume beaconing when unwrapped.

11. The apparatus of claim 9 further comprising means for isolating slots and ports which cause the token ring network to be beaconing, said means operative when said token ring continues to beacon after wrapping all newly inserted stations and all RI/RO ports, said means comprising:

means for wrapping all faulty slots associated with said token ring network; and means for wrapping each port associated with said token ring network which is coupled to a faulty station which causes said token ring network to beacon.

12. The apparatus of claim 6 wherein said token rings of said first type are backplane rings and said token rings of said second type are local segment token rings associated with a single slot in said concentrator, said second processing means comprising:

means for wrapping all ports in a local segment token ring;

means for iteratively unwrapping said ports one port at a time;

means for determining if said local token ring network is beaconing; and means for rewrapping ports which cause said local segment token ring network to resume beaconing.

13. A method for remote detection and isolation of faulty stations in a token ring network comprising the steps of:

counting beacon data frames traversing said token ring network;

counting good data frames traversing said token ring network;

polling the token ring network for beacon data frame and good data frame count information;

initiating a beacon removal process for said token ring network if said beacon data frame count information has incremented since a previous polling step; and initiating a beacon removal process for said token ring if said good frame count information has failed to increment for a predetermined number of polling steps.

14. The method of claim 13 wherein said beacon removal process comprises the steps of:

performing a remote backplane ring beacon removal process if said token ring is a backplane ring in a concentrator; and performing a remote local segment beacon removal process if said token ring is a local segment token ring.

15. The method of claim 14 wherein said remote backplane removal process comprises the steps of:

wrapping all newly inserted stations in said concentrator;

remotely determining if said token ring is still beaconing after wrapping all newly inserted stations; and isolating faulty new stations if said token ring has stopped beaconing.

16. The method of claim 15 wherein said isolating faulty new stations comprises the steps of:

iteratively unwrapping the newly inserted stations one station at a time;

remotely determining if said token ring network has resumed beaconing; and rewrapping newly inserted stations that cause beaconing to resume.

17. The method of claim 15 further comprising the steps of:

wrapping all ring-in/ring-out (RI/RO) ports in said concentrator associated with said token ring;

remotely determining if said token ring is still beaconing after wrapping all RI/RO ports; and isolating RI/RO ports that cause beaconing if said token ring network stops beaconing when all RI/RO ports are wrapped.

18. The method of claim 17 wherein said step of isolating RI/RO ports comprises the steps of:

iteratively unwrapping said RI/RO ports one RI/RO port at a time;

remotely determining if said token ring network has resumed beaconing; and rewrapping RI/RO ports that cause beaconing to resume.

19. The method according to claim 17 further comprising the steps of:

isolating faulty slots in said concentrator; and isolating faulty ports in said concentrator.

20. The method of claim 19 wherein said step of isolating faulty slots comprises the steps of:

wrapping all ports on the token ring network;

iteratively unwrapping each concentrator slot participating in the token ring network one at a time while keeping the ports wrapped;

remotely determining if said token rig network has resumed beaconing; and rewrapping slots that cause beaconing to resume.

21. The method of claim 20 wherein said step of isolating faulty ports comprises the steps of:

wrapping all ports on the token ring network;

iteratively unwrapping each port one at a time;

remotely determining if said token ring network is beaconing; and rewrapping ports that cause the token ring network to beacon when unwrapped.

22. The method of claim 14 wherein said remote local segment beacon removal process comprises the steps of:

wrapping all ports in the local segment;

iteratively unwrapping all phantom and ring-in/ring-out (RI/RO) ports in the local segment;

remotely determining if said local segment token ring network is beaconing;

rewrapping phantom and RI/RO ports that cause beaconing when unwrapped; and unwrapping all non-phantom ports on the local segment.

* * * * *